(12) United States Patent
Abraham et al.

(10) Patent No.: US 6,667,364 B2
(45) Date of Patent: Dec. 23, 2003

(54) PROCESSABLE POLYETHYLENE/EPDM THERMOPLASTIC VULCANIZATES

(75) Inventors: Tonson Abraham, Strongsville, OH (US); Norman G. Barber, Norwalk, OH (US)

(73) Assignee: Advanced Elastomer Systems LP, Akron, OH (US)

( * ) Notice: Subject to any disclaimer, the term of this patent is extended or adjusted under 35 U.S.C. 154(b) by 406 days.

(21) Appl. No.: 09/751,886

(22) Filed: Dec. 29, 2000

(65) Prior Publication Data

US 2002/0137835 A1 Sep. 26, 2002

(51) Int. Cl.$^7$ .............................. C08K 5/10; C08L 53/00
(52) U.S. Cl. ...................... 524/505; 524/114; 524/310; 524/313; 524/525
(58) Field of Search ................................ 524/525, 505, 524/114, 313, 310

(56) References Cited

U.S. PATENT DOCUMENTS

| | | | | |
|---|---|---|---|---|
| 3,957,919 A | * | 5/1976 | Von Bodungen et al. | 260/897 A |
| 4,059,654 A | * | 11/1977 | Von Bodungen et al. | 260/897 A |
| 4,088,714 A | * | 5/1978 | Huff | 260/897 A |
| 4,130,535 A | * | 12/1978 | Coran et al. | 260/33.6 AQ |
| 4,803,244 A | * | 2/1989 | Umpleby | 525/105 |
| 4,916,180 A | * | 4/1990 | Robinson et al. | 524/456 |
| 5,290,886 A | * | 3/1994 | Ellul | 524/515 |
| 5,310,800 A | * | 5/1994 | Shimizu et al. | 525/193 |
| 5,656,693 A | * | 8/1997 | Ellul et al. | 525/171 |
| 5,936,028 A | * | 8/1999 | Medsker et al. | 524/506 |
| 5,977,260 A | * | 11/1999 | Ciaccia | 525/236 |

FOREIGN PATENT DOCUMENTS

| | | | |
|---|---|---|---|
| EP | 0 143 131 A1 | * | 6/1985 |
| EP | 0 461 887 A1 | * | 12/1991 |
| JP | 4-106137 | * | 4/1992 |

* cited by examiner

*Primary Examiner*—Peter D. Mulcahy
(74) *Attorney, Agent, or Firm*—Alfred D. Lobo; William A. Skinner

(57) ABSTRACT

A blend of an EPDM made with VNB instead of ENB and specified melt viscosity reducers is imbued with a unique ability to form a processable blend with a polyolefin phase in which PE is present in a major amount by weight relative to PP. In the substantially fully cured vulcanizate (TPV) of the blend the ratio of PE to pEPDM is in the range from more than 1:3 up to about 1:0.6. This blend is made processable with less than 200 phr of a processing oil in presently available commercial processing equipment by using an inert melt viscosity reducer which is compatible with the pEPDM and PE phases without being substantially miscible in either. A preferred melt viscosity reducer is chosen from (a) a polyolefin selected from the group consisting of isotactic poly(1-butene), ethylene-co-1-butene, propene-co-1-butene and ethylene-co-propene-co-1-butene; (b) oils and waxes having a solubility parameter in the range from about 19.5 to 21.5; and (c) a block copolymer of a fatty acid and polyethylene oxide having a melting point lower than 150° C.

12 Claims, No Drawings

PROCESSABLE POLYETHYLENE/EPDM THERMOPLASTIC VULCANIZATES

FIELD OF THE INVENTION

"Thermoplastic vulcanizates" or "TPVs" (also referred to in the past as "thermoplastic elastomers" or "TPEs") are made by dynamic vulcanization of a blend of an olefin rubber and a crystalline polyolefin ("PO") which becomes the continuous phase in which microscopic rubber particles are held. A processable TPV is formulated in which polyethylene ("PE") constitutes a major proportion by weight of the continuous PO phase (referred to herein as a "PE-rich TPV"), with melt viscosity reducers used in a defined range. TPVs formulated with a specified melt reducer in the stated range may contain PE in an amount greater than 25% by weight, based on all the polymer (PO and rubber) in the TPV.

BACKGROUND OF THE INVENTION

The term "elastomer" is used in the broad sense, in that the cured blend is processable as a TPV, and is re-processable, unlike a thermoset resin. By "processable" is meant that a dynamically vulcanized blend can be thermoformed, typically injection molded, extruded, vacuum-formed or blow-molded in a commercially available machine. Such extruders and injection molding machines for TPVs provide internal mixing at a temperature in the range from about 180° C. to 240° C. with a residence time less than 5 min, preferably in the range from 30 sec to 2 min. In practice, an attempt to make a useful and marketable TPV by substituting PE for polypropylene ("PP") present in an amount greater than 25% based on the weight of polymer (PO and EPDM) present, in a randomly chosen EPDM results in a blend which is not processable. In processable TPVs which are "self-cured" and not physical blends, their combination of desirable elastic and thermoplastic properties depends on the respective amounts of "hard" and "soft" phases provided by each component, and the properties of each component. In most cases, the prior art fails to recognize the unusually high melt viscosity of PE-based TPVs and routinely disclose that PP in PP/EPDM TPVs may be substituted with PE or any other polyolefin without the benefit of an enabling illustrative example.

Commercially available TPVs generally consist of micron-sized (1–10 $\mu$m) crosslinked EPDM rubber particles embedded in a continuous phase mainly of PP having various crystallinities. EPDM is a copolymer of ethylene, propylene, and a diene providing a cure site monomer, most commonly ethylidenenorbornene ("ENB"). Such TPVs are produced by the dynamic vulcanization of blends of EPDM rubber in molten PP, the rubber being selectively cured during intense mixing. (see "Thermoplastic Elastomers" by G. Holden et al, ed. Chap 7, Hansen Publishers, 2nd ed., 1996).

For PP/EPDM TPVs, an increase in blend melt viscosity during TPV formation results presumably from the increased rubber/plastic contact area generated by the micron-sized particles in a continuous plastic phase. The viscous drag of the molten plastic over the rubber particles is a major contributor to melt viscosity of the TPV, with additional contributions due to deformation within and interactions between the rubber particles. Though melt viscosity of PP/EPDM TPVs allows their processability, a PE-rich TPV is not "processable" because of its unusually high melt viscosity.

In most known, usable TPVs, PP is the continuous hard phase and the EPDM is the soft phase present as discrete particles. In the novel TPV, PE is in the continuous "hard" phase, and the "soft" phase is chosen from (i) a copolymer of ethylene-propylene-5-vinyl-2-norbornene, an EPDM rubber containing pendent vinyl unsaturation (hereafter either is referred to as "EP(VNB)" or "pEPDM" to connote the particular olefinic rubbers), and (ii) butyl rubber having a pendent vinyl cure site (referred to as "pButylR") By varying the ratios of the components including the amount of processing oil, within limits beyond which the TPV is unusable, one is expected to be able to provide desired hardness/softness, oil and temperature resistance, oxidation resistance, and processability, inter alia.

In U.S. Pat. Nos. 3,957,919 and 4,059,654 to Von Bodungen, et al. the beneficial effect of PE in the TPV is secured when PE is present in an amount greater than 15% but not more than 25%, with the remainder of 70% to less than 85% by weight divided between the EPDM interpolymer and the monoolefin polymer in the ratio of 90–10 parts by weight of EPDM polymers to 10–90 parts by weight of monoolefin polymers. The PE component may include copolymers of ethylene containing 10% or less copolymerized $\alpha$-olefins having from 3–16 carbon atoms.

But the '654 disclosure teaches that within the ambit of the proviso with respect to ratios, any PO may be added to a PE and PP combination in any EPDM and worked with any free radical generating agent to provide TPVs with acceptable compression set. This broad disclosure of any EPDM interpolymer reads on a vast array of EPDMs including ethylene-propylene-5-vinyl-2-norbornene; and, of any PO, reads on a vast array including poly-1-butene, and copolymers of ethylene-co-butene and ethylene-co-propene-1-butene, which are peculiar in that they have a melt viscosity lower than that of PP. It is believed that, unlike other poly-$C_3$–$C_{16}$-olefins, the common characteristic which makes the aforementioned polymers and some amorphous polymers useful as melt viscosity reducers in a PE-rich TPV is their peculiar morphology in the rubber/plastic contact area, and the resulting low viscous drag of the molten plastic over the rubber particles. The melt viscosity reducer appears to maintain itself as a separate phase in each of the phases of the vulcanizate, making the TPV processable.

EP(VNB) or pEPDM and pButylR are readily blended in the molten state in any proportions with PE. Such high compatibility of molten PE with these rubbers is greater than that of a blend in which PP is substituted for PE. However, when such a substantially "PE only" blend is vulcanized, the TPV has too high a viscosity to be processable; that is, when measured in an automatic capillary rheometer ("ACR"), the viscosity is above 8000 Poise at 200° C. Such high viscosity is too high to allow the components of the TPV to be processable in commercially available equipment. The high viscosity is attributable to the compatibility of PE with EPDM rubber. A TPV of PP/EP(VNB) or PP/pButylR in which either PP or the rubber is present in a larger amount than the other, is deemed processable; but a TPV of PE/EP(VNB), or PE/pButylR in which the rubber is present in a larger amount than the PE, or vice versa, defies extrusion or fabrication (referred to as having "poor fabricability") in such equipment.

Though the disclosure of the '654 patent teaches that all TPVs containing high density PE in an amount greater than 15% by weight of the total EPDM-PO-PE but in which the PE component does not exceed 25% by weight, are ideally suited for use in the manufacture of flexible hose, EP(VNB) substituted for EPDM is not. Neither is a blend of EP(VNB) with 25% PE processable when cured with a silane curing agent. (see Examples 32, 33 and 34 in Table 8 herebelow).

Because trouble-free processsability in commercially available injection molding machines and extruders is tied to melt viscosity, a blend of rubber and PO only, that is, without any processing aids including oil, is required to have a melt viscosity in the range from about 200 P (Poise) to 4000 P. Above 4000 P the processability diminishes progressively and at 8000 P a blend is deemed unprocessable. At about 8000 P the melt viscosity of a TPV, as measured in a Monsanto ACR Model No. 3501, at 204° C. (400° F.) and 118 kPa constant stress is so high that there is no transfer, or an insufficient amount of transfer of polymer from the melting zone in the tube, to trip a switch in the tube at the end of 4 min, thus starting the measurement.

Blends having a melt viscosity in the range from 4000 P to 8000 P are made processable by adding conventional processing aids.

The Problem

To benefit from the properties of a TPV containing a major proportion of PE relative to polypropylene ("PP"), most preferably PE only, in the continuous plastic phase of the TPV, it is desired to use a vulcanizable blend of EPDM, polyolefin(s), and processing aids including melt viscosity reducers, which is "processable" to produce a TPV with desirable properties and in which TPV the processing oil does not bleed out. The result sought for is a fabricatable TPV in which the ratio of PE to EPDM is in the range from more than 1:3 to about 1:0.6, by weight, on an oil-free basis, based on total polymer present (defined herein as PO and EPDM only, excluding polymeric melt viscosity reducer); in particular, where the PO includes a PO other than PE, typically PP, PE itself is to be present in more than 25% by weight, based on total polymer present. The prior art failed to recognize that, for such PE-rich TPVs of commercial interest, a blend of components in the aforespecifed range becomes unprocessable in a one-step process. In other words, it is not feasible to process such TPVs in available commercial extruders and injection molding machines to make a marketable product. The problem was to find a combination of rubber and melt viscosity reducer (additive with specifically defined characteristics) which allows a PE-rich TPV containing a PE plastic phase, as specified, to be extruded, injection molded, or otherwise fabricated in a manner analogous to a TPV of PP/EPDM, e.g. those commercially available as Santoprene® brand TPVs, without substantially compromising the properties of the finished article of PE-rich TPV.

Solutions to date

Additives including processing aids, compatibilizers, plasticizers, extenders and melt viscosity reducers have, to date, been unsatisfactory in a PE-rich TPV because so large an amount of the additive was required to provide processability that either the properties of the TPV were compromised, or the additive exuded from the fabricated article over a period of less than one year. No acceptable solution has been provided to date.

Numerous prior art references teach using a PO and EPDM to form a TPV but limit their examples to the use of PP or PP containing up to 20% PE. Such references assumed that processing a blend of EPDM/olefin in which PE was substituted for the PP should provide no serious difficulty because PE, and HDPE in particular, is readily blended with a wide spectrum of cross-linkable rubbers before the blend is cured. As is well known, high ratios of PO, whether PP or PE, relative to EPDM, in the range above 6:1; and high ratios of EPDM to PO in the range above 6:1, are easily processable while curing because their ACR viscosities are lower than about 5000 Poise.

U.S. Pat. Nos. 4,130,534 and 4,130,535 to Coran et al disclose dynamically vulcanized thermoplastic elastomer compositions comprising butyl rubber and PO, and olefin rubber and PO, respectively. The addition of plasticizers and aromatic, naphthenic and paraffinic extender oils to the blend is suggested. No details are given regarding the choice or suitability of any particular class or type of plasticizers. It is well known that different rubbers are compatible with certain types of plasticizers and that not all plasticizers are suitable with all rubbers.

In U.S. Pat. No. 5,290,886, Ellul teaches that low molecular weight (<10,000) organic esters and alkyl ether esters plasticize a blend of crystalline PO homopolymer or copolymer, and, an olefinic rubber, each present in the range from 10% to 90% of vulcanizate, provided the plasticizer is compatible with both phases, the PO and the rubber. These oils and waxes have a solubility parameter below 19.5. A method for calculating the solubility parameter of an oil or wax is disclosed in "Properties of Polymers", Ch. 7, by D. W. vanKrevelen, Elsevier Press, Amsterdam, 1990. Moreover, the requirement for a plasticizer is that it be miscible in both phases, hard and soft; a melt viscosity reducer is not substantially miscible in both phases. Still further, the plasticizer used therein is a critical component to lower the Tg of the blend, and not related to providing processability. This is evident from the TPV made in Example 5 where all the plasticizer was added after dynamic vulcanization of a PP (219.1 parts), EPDM (100 parts) was completed. The TPV included active black (19.28 parts), clay (40 parts), curatives (10.5 parts). (see col 6 of '886). A comparable PE/EPDM formulation will not come through the barrel of the Monsanto ACR.

The easy processability of the '886 composition was predicated upon using a low molecular weight ester plasticizer in a major amount by weight of PP relative to the EPDM, and the PP may contain as much as 20% PE. The plasticizer provided the TPV with improved low temperature properties. Since the processability of the PP-rich blend is not related to the low temperature properties of the TPV but to the viscosity of the blend after curing, it is evident that processability was not a concern with the Ellul composition. To illustrate, in Example 5, the ACR viscosity was low because there is more plasticizer than EPDM; and more than twice as much isotactic PP as there is EPDM. The limitation on the amount of PE is dictated by the poor processability of the PP/EPDM vulcanizate—the PP may contain no more than 20% by weight (wt %) PE. Such vulcanizates are sensitive to ultra-violet (UV) light and thermal oxidation which sensitivity would be greatly diminished if PE was substituted for the PP. Moreover substituting PE for PP tends to yield elastomers which are tougher, stronger and softer, that is, have a lower Durometer reading. However, the temperature at which the EPDM/PE may be used will be lower than the PP/EPDM vulcanizates taught in the '886 patent.

To evaluate the perceived advantages of using PE, processability is specified as a function of ACR viscosity measured under specified conditions representative of the mean processing conditions typically encountered in commercial processing equipment; and, processability of a PE-rich/EPDM blend with various additives is explored. The priority was to find an additive which remained as a separate phase in both phases, the PE and the rubber. Though the '886 patent teaches that a low molecular weight plasticizer will improve low temperature properties of a PO/rubber vulcanizate, the patent does not teach the effect of such esters, or any other additives on melt viscosity; and the patent is silent as to what criteria might lead to the choice of a reducer which would lower melt viscosity. Since the problem addressed in the '886 invention was to find a TPV with better low temperature properties, the emphasis was to identify those compounds which gave better low-temperature properties without regard to the processability of the composition with the plasticizer. Accordingly, all samples were prepared in a laboratory Brabender-Plasticorder (as they have been for the illustrative examples in this invention) without regard to the time or energy requirements, and being interested only in the low temperature properties of the TPV, measured viscosity only for the aforesaid composition (219.1 parts of PP and 100 parts of EPDM). There is no other reference to the viscosity of the mixture, for any reason.

SUMMARY OF THE INVENTION

It has been discovered that in combination with certain melt viscosity reducers, a blend of "pEPDM" or "EP(VNB)" with more than 25% by weight PE, based on all polymer present but excluding any polymeric melt viscosity reducer, is a processable blend, as defined. The pEPDM is most preferably present in a major amount by weight relative to the olefin continuous phase, and if PP is in the olefin phase, PE is present in a major amount by weight relative to PP in the cured TTV. A substantially fully cured vulcanizate of the blend is referred to as "PE/pEPDM" or "PE/EP(VNB)". Preferably the ratio of PE to pEPDM in the blend is in the range from more than 1:3 and up to about 1:0.6, by weight, based on total polymer present, the PE always being present in an amount greater than 25% by weight, based on total polymer present, and the pEPDM interpolymer consisting essentially of ethylene in a major proportion relative to another polymonoolefin containing from 3–5 carbon atoms, and from 0.5% to 5% by weight VNB. This blend, containing from about 50 phr but less than about 200 phr of processing oil including an oil specifically designated as a melt viscosity reducer, is preferably processed in presently available commercial processing equipment by using an inert melt viscosity reducer which is compatible with the pEPDM or pButylR and PE phases without being substantially miscible in either. Such a reducer is chosen from (a) specific polyolefins which, as melt viscosity reducers, do not behave as other polyolefins of $C_2$–$C_4$ olefins in an EPDM blend, (b) melt viscosity reducing oils or waxes, and (c) a block copolymer of a fatty acid and polyethylene oxide having a Tg below 150° C., most preferably, poly(12-hydroxystearic acid)-b-polyethylene glycol-b-poly(12-hydroxystearic acid). A specific melt viscosity reducing polyolefin is chosen from (i) isotactic poly(1-butene), ethylene-co-1-butene, and propene-co-1-butene having a $M_W$ in the range from 20,000 to about 900,000, preferably from 500,000 to 800,000, and (ii) ethylene-co-propene-co-1-butene having a $M_W$ in the range from 20,000 to about 900,000, preferably from 30,000 to 60,000. Melt viscosity reducing oils have a solubility parameter in the range from 19.5 to 21.5, relatively low molecular weight in the range from about 300 to about 2000, and have a high hydrocarbon content but a low level of polar organic groups. Such oils and waxes include epoxidized vegetable oils, and ethoxylated allylphenols; epoxidized soybean oil, ethoxylated castor oil, hydrogenated castor oil and ethoxylated nonylphenol. These criteria are believed to allow a specified oil to maintain itself as a separate phase in each of the phases of the vulcanizate, namely the PE phase and the rubber phase. By "substantially fully cured" is meant that less than 3% rubber is extractable in cyclohexane at 23° C.

It is therefore a general object of this invention to provide a composition comprising (a) a processable mixture of (i) an olefinic rubber selected from the group consisting of an ethylene-propylene-VNB rubber and a butyl rubber with a pendent vinyl cure site, and (ii) substantially crystalline PE and olefinic rubber present in a ratio ranging from more than 1:3 up to about 1:0.6, and, (b) from about 5 to about 50 parts, total, of one or more specified melt viscosity reducers per hundred parts of olefinic rubber and PE combined. The specified melt viscosity reducers are also effective to varying degrees with PE-rich TPVs produced from butyl rubber and PE where a minor portion relative to the PE may be PP.

It is a specific object of this invention to provide a processable PE-rich blend of a pEPDM and PE in combination with one or more of the aforespecified melt viscosity reducers, in which pEPDM, ethylene is present in the range from about 50 to 70% by weight, VNB is present in the range from about 0.5 to 5% by weight, the remainder being propylene.

DETAILED DESCRIPTION OF PREFERRED EMBODIMENTS

The PE may be any commercially available highly crystalline PE, preferably a high density PE ("HDPE") which has a density (sp. gr.) of about 0.941 to about 0.965 g/cc and a MI in the range from 2 to 20. HDPE is commercially available in different forms, each typically having a relatively high dispersity in the range from about 20 to about 40.

The non-conjugated diene in pEPDM is 5-vinyl-2-norbornene (VNB).

The term "butyl rubber" includes copolymers of an isoolefin and a conjugated monoolefin, terpolymers of an isoolefin, a conjugated monoolefin and divinyl aromatic monomers, and the halogenated derivatives of such copolymers and terpolymers, all of which have pendent vinyl groups. The useful pButylR copolymers comprise a major portion of isoolefin and a minor amount, usually less than 30 wt %, of a conjugated multiolefin. The preferred copolymers comprise about 85–99.5 wt % of a $C_{4-7}$ isoolefin such as isobutylene and about 15–0.5 wt % of a multiolefin of 4–14 carbon atoms, such as isoprene, butadiene, dimethyl butadiene and piperylene. Commercial pButylR useful in the invention, is a copolymer of isobutylene and minor amounts of isoprene. Other butyl co- and terpolymer rubbers are illustrated by the description in U.S. Pat. No. 4,916,180, which is fully incorporated herein by this reference.

Mixtures of any of the above EPDM and pButylR can be employed, rather than only one. The advantages of the vulcanizate stem from the presence of the PE which imbues the vulcanizate with better UV and thermooxidative stability than is obtained with PP, and at lower cost; a desirable vulcanizate may be softer than one made with a comparable amount of PP; comparable creep properties in the range from about 23° C. to about 65° C. despite the lower melting point of PE and the lower modulus of EPDM/PE TPVs compared to those made with PP, and as a result, better compression set.

Whichever melt viscosity reducer, or combination of reducers is used, the amount used is in the range from about 5–50 phr, preferably 10–35 phr. The melt viscosity reducer oil or wax is selected from ethoxylated alkylphenols, ethoxylated castor oil, hydrogenated castor oil and epoxidized vegetable oils. Ethoxylated alkylphenols are typically nonylphenol and related ethoxylated derivatives. A preferred epoxidized vegetable oil is of soybean oil.

When the proportion of PE and pEPDM in the blend is in the range from 1:3 up to about 1:0.6, the presence of from 150 phr to 200 phr of processing oil, most preferably a paraffinic oil, based on 100 parts by weight of pEPDM, does not substantially lower the melt viscosity of the TPV. Moreover, in this range of from 150 phr to 200 phr, unless part of the processing oil, preferably a minor proportion by weight, based on total oil present, is replaced with another oil designated a melt viscosity reducer, exudation is a problem, so that it is not practical to have a TPV of pEPDM containing more than 200 phr processing oil not including a melt viscosity reducing oil.

The PE-rich blend with EP(VNB) is dynamically vulcanized with a curative chosen with respect to the EP(VNB) or pButylR used. Curing may be effected with a peroxide as disclosed in the '654 patent, or with a silane as disclosed in U.S. Pat. Nos. 4,803,244 and 5,936,028, disclosures of which curatives relating to the use thereof, are incorporated by reference thereto as if fully set forth herein. Most preferred for pEPDM is a hydrosilation cure.

The Process

The one-step process for making a vulcanized blend of PE and rubber is carried out in a Brabender-Plasticorder, model EPL-V5502. The mixing bowl had a capacity of 85 ml with the cam rotors employed. A TPV is produced by initially mixing the plastic, followed by the addition of rubber and inorganic filler (clay) while mixing. After addition of the clay, the melt is homogenized by continued mixing for about 2 min before portionwise addition of a silicon hydride curative. After cure initiation by addition of platinum catalyst, curing is allowed to proceed for about 2 min before adding the viscosity reducer. Some of the oil, preferably a major amount of all oil added, is pre-blended with the rubber. In some cases the viscosity reducer is added before the platinum catalyst. About 4 minutes was allowed for the uniform distribution of the viscosity reducer in the mixture, after which the TPV is sheeted, then compression molded at 210° C. (410° F.) to obtain physical properties. ACR viscosity is measured in the standard ASTM manner using the sheeted material cut into strips and then comminuted.

If desired, the rubber and PE may be mixed with a metal stearate, e.g. potassium stearate, or potassium stearate concentrate. To the mixture is optionally added a lubricant, a processing aid, a plasticizer and an antioxidant. Evolved gases are removed through an exhaust duct. Examples of inorganic fillers are calcined clay, titanium dioxide, silica and talc; examples of organic fillers are crushed peanut, cashew shells, coconut charcoal, saturated hydrocarbon and fluorocarbon polymers. The components are intimately mixed in a mixing zone such as an injection molding machine or extruder having a barrel of sufficient length for stage-wise addition of ingredients, with a high enough input energy, and for a sufficient period of time to produce the TPV in a single stage.

In a commercial extruder, a minimum energy input is typically at least 0.25 Kw-hr/lb. The reaction mass is melt-mixed until the torque exerted by the cross-linked mass suddenly increases. A failure to generate the sudden increase in torque indicates that the extent of the desired crosslinking is so low as to yield an unsatisfactory vulcanizate. The crosslinked mass is then molded, preferably directly, by injection molding or extrusion into a desired shaped article, for example hoses, gaskets, bellows, seals, and the like.

The particular results obtained by the aforedescribed dynamic curing process are a function of the curing system selected for its effectiveness at a temperature in the range from about 180–200° C. without being degraded, or causing degradation of the vulcanized blend while held in the temperature range for a period from 30 sec to 5 min.

In the following illustrative examples: melt index (MI) of PE is measured at 190° C. and 2.16 Kg load; the "melt flow rate" (MFI) of PP is measured at 230° C. and 2.16 Kg load; and, all references to "parts" are to "parts by weight" of the components identified below:

Polyolefin:
PE LL 1001.37 (ExxonMobil Chemical Co.)—linear low density PE with about 6% by weight copolymerized 1-butene, 0.918 g/ml, mp 121° C., MI 1.0.
PE HD 6706.19 (ExxonMobil Chemical Co.)—high density PE, 0.9525 g/ml, mp 130° C., MI 6.7
PE HD 6733.17 (ExxonMobil Chemical Co.)—high density PE, 0.950 g/ml, mp 130° C., MI 35.
PP D008M (Aristech Chemical Co.) mp 164° C., MI 0.8; $M_W$ 600,000; isotactic; polydispersity ("PD") 6.0; ACR viscosity 2091 P.

Elastomer:
VX 1696 (ExxonMobil Chemical Co.) EP(VNB) ethylene 63%, propylene 36.3%, 0.7% VNB, by weight, preblended with 100 phr Sunpar 150 LW paraffinic oil;
$M_L$ (1+4) 100° C. 43–63.

Curative:
DC 2–2822—partially octylated trimethylsilyl terminated methyl hydrogen siloxane polymer (average degree of polymerization "DP"=42).
DC 2–5084—structurally same as DC 2–2822 but with DP=18.
DC 5–0210—trimethylsilyl terminated methyl hydrogen siloxane polymer DP=18.

Cure Catalyst:
PC 085 (United Chemical Technologies)—2.25 wt % Pt° in mostly $D_4$ methylvinylsiloxane diluted to 0.05 mg/g Pt° with Sunpar 150M paraffinic oil.

Viscosity Reducers:
Poly(1-butene) homopolymer having a mol wt $M_W$ in the range from about 20,000 to about 900,000.
Ethylene-co-1-butene in which ethylene is from 1 to 50 mol %
Propene-co-1-butene in which propene is from 1 to 60 mol %
Ethylene-co-1-butene-co-propene in which ethylene is 1–50 mol %, propene is 1–60 mol % and 1-butene is 40–98 mol %.
Vestoplast 750 and 608 (Crowly Chemical Co.)—ethylene-co-propylene-co-1-butylene;
Vestoplast 750—ethylene 6%; propene 66%; 1-butene 28% by wt.
Vestoplast 608—ethylene 6%; propene 28%; 1-butene 66% by wt.
Polytac 500—atactic PP, 0.90 g/ml
Hypermer B 246 SF (ICI Surfactants)—Poly(12-hydroxystearic acid)-b-polyethylene glycol-b-poly(12-hydroxystearic acid).

Epoxidized soybean oil:
Vikoflex 7170 (Elf Atochem): 7.3% oxygen as oxirane, Iodine # 0.8.
Plasthall ESO (C. P. Hall Co.) 6.9% oxygen as oxirane, Iodine # 1.0.

Ethoxylated Castor Oil:
Trylox 5900 (Henkel Corp.)—5 ethylene oxide units per castor oil molecule; the ethylene oxide units may be substituted with propylene oxide units.

Ethoxylated Nonylphenol with from 1 to 10 ethylene oxide units:
Trycol 6974 (Henkel Corp.)—10 ethylene oxide units per nonylphenol.
Trycol 6961 (Henkel Corp.)—4 ethylene oxide units per nonylphenol.

Paraffinic Oil: Sunpar 150 LW: (Sun Chemical Co.)—hydrotreated heavy paraffinic oil—flash point 249° C. (480° F.) (COC)

CLAY: (Burgess Pigment Co.) Icecap K Clay—anhydrous aluminum silicate.

All examples are run under temperature and pressure conditions stated above. Example 1 presents the results when a PP/EP(VNB) blend is dynamically blended with no curative, indicating an ACR (melt viscosity) of 277 P; and example 2 presents the results when the same blend is vulcanized with a curative yielding a TPV with ACR viscosity of 3968 P, which is processable.

Example 3 presents the results when PE is substituted for PP in the prior EP(VNB) blend and dynamically blended with no curative, indicating an ACR (melt viscosity) of 5163 P; and example 4 presents the results when the same PE/pEPDM blend is vulcanized with a curative yielding no polymer transferred to trip the switch in the ACR tube at the end of 4 min, indicating the polymer is unprocessable. Addition of more oil results in a modest decrease in viscosity but still too high to be processable (see Ex. 7).

TABLE 1

| Ex. No. | 1 | 2 | 3 | 4 | 5 | 6 | 7 |
|---|---|---|---|---|---|---|---|
| PE(VNB) | 100 | 100 | 100 | 100 | 100 | 100 | 100 |
| PE HD 6706.19 | — | — | 60. | 60. | 60. | 60. | 60. |
| PP D008M | 60. | 60. | — | — | — | — | — |
| Icecap Clay | 42 | 42 | 42 | 42 | 42 | 42 | 42 |
| DC 2-2822 | — | 2.0 | — | 2.0 | 2.0 | 2.0 | 2.0 |
| Pt soln (.05 mg/g) | — | 1.5 | — | 1.5 | 1.5 | 1.5 | 1.5 |
| Sunpar 150 LW* | 130. | 130. | 130. | 130. | 130. | 130. | 130. |
| Hardness, Shore A | 60 | 68 | 55 | — | 62 | 59 | 54 |
| UTS (MPa) | 2.57 | 6.32 | 3.21 | — | 5.51 | 5.14 | 4.28 |
| UE (%) | 433 | 393 | 723 | — | 505 | 531 | 443 |
| M 100 (MPa) | 1.89 | 3.45 | 1.72 | — | 2.76 | 2.51 | 2.2 |
| CS, % 22 hr 100° C. | 84 | 35 | 45 | — | 28 | 28 | 31 |
| Wt gain, %[1] | 153 | 123 | Disin | — | 209 | 209 | 205 |
| Tension Set (%) | 36 | 13 | 21 | — | — | — | — |
| ACR visc (Poise) | 277 | 3968 | 5163 | NO | 97208 | 78348 | 24246 |

*100 parts of the oil is preblended with 100 parts of EP(VNB) in VX 1696
[1]weight gain measured over 72 hr at 125° C.

When a higher mol wt PE (PE LL 1001.37, MI=1.0) is substituted for HDPE 6706.19, as in Ex. 8, with no curative, ACR viscosity increases to 11,140 P compared to that obtained in Ex. 3 (5163 P). When curative is added the blend is unprocessable—there is no transferred product (Ex. 9).

When a much lower mol wt PE (PE HD 6733.17, MI=33) is substituted for PE LL 1001.37 and curative is added the blend is still unprocessable (Ex. 10).

TABLE 2

| Ex. No. | 8 | 9 | 10 |
|---|---|---|---|
| PE(VNB) | 100 | 100 | 100 |
| PE LL 1001.37 | 60 | 60 | — |
| PE HD 6733.17 | — | — | 60 |
| Icecap Clay | 42 | 42 | 42 |
| DC 2-2822 | — | 2.0 | 2.0 |
| Pt soln (.05 mg/g) | — | 1.5 | 1.5 |
| Sunpar 150 LW* | 130. | 130. | 135.6 |
| Hardness, Shore A | 42 | — | 60 |
| UTS (MPa) | 2.86 | — | 5.72 |
| UE (%) | 950 | — | 433 |
| M 100 (MPa) | 1.20 | — | 2.84 |
| CS, % 22 hr 100° C. | 52 | — | 31 |
| Wt gain, %[1] | Disin | — | 175 |
| Tension Set (%) | 19 | — | 11 |
| ACR visc (Poise) | 11140 | No Trans | No Trans |

*100 parts of the oil is preblended with 100 parts of EP(VNB) in VX 1696
[1]weight gain measured over 72 hr at 125° C.

Increasing the relative amount of PE in the plastic phase increases hardness but the blend remains unprocessable—this is illustrated in examples 11–14 in Table 3 below.

TABLE 3

| Ex. No. | 11 | 12 | 13 | 14 |
|---|---|---|---|---|
| PE(VNB) | 100 | 100 | 100 | 100 |
| PE HD 6706.19 | 60 | 100 | 200 | 300 |
| Icecap Clay | 42 | 42 | 42 | 42 |
| DC 5-0210 | 3.0 | 3.0 | 3.0 | 3.0 |
| Pt soln (.05 mg/g) | 4.0 | 4.0 | 4.0 | 4.0 |
| Sunpar 150 LW* | 130. | 130. | 130 | 130 |
| Hardness, Shore A | 63 | 78 | 89 | 92 |
| UTS (MPa) | 8.59 | 10.29 | 12.1 | 14.39 |
| UE (%) | 367 | 426 | 569 | 712 |
| M 100 (MPa) | 3.81 | 5.67 | 8.48 | 10.6 |
| CS, % 22 hr 100° C. | 21 | 26 | 38 | 43 |
| Wt gain, %[1] | 153 | 144 | 113 | 126 |
| Tension Set (%) | 11 | 17 | 32 | 40 |
| ACR visc (Poise) | No Trans | No Trans | No Trans | No Trans |

*100 parts of the oil is preblended with 100 parts of EP(VNB) in VX 1696
[1]weight gain measured over 72 hr at 125° C.

The effect of using illustrative amorphous hydrocarbon polymers as melt viscosity reducers is presented in the following Table 4 (Examples 15–18).

TABLE 4

| Ex. No. | 15 | 16 | 17 | 18 |
|---|---|---|---|---|
| PE(VNB) | 100 | 100 | 100 | 100 |
| PE HD 6706.19 | 60 | 60 | 60 | 60 |
| Icecap Clay | 42 | 42 | 42 | 42 |
| DC 2-2822 | 2.0 | 2.0 | 2.0 | 2.0 |
| Pt soln (.05 mg/g) | 1.5 | 1.5 | 1.5 | 1.5 |
| Sunpar 150 LW* | 135.6 | 135.6 | 135.6 | 135.6 |
| Vestoplast 750 | 35.6[2] | 35.6[3] | | |
| Vestoplast 608 | — | — | 35.6 | — |
| Hardness, Shore A | 59 | 57 | 55 | 54 |
| UTS (MPa) | 4.9 | 4.53 | 4.08 | 3.92 |
| UE (%) | 394 | 348 | 360 | 349 |
| M 100 (MPa) | 2.61 | 2.34 | 2.34 | 2.13 |
| CS, % 22 hr 100° C. | 27 | 32 | 28 | 25 |
| Wt gain, %[1] | 187 | 207 | 189 | 216 |
| Tension Set (%) | 12 | 11 | 12 | 12 |
| ACR visc (Poise) | 2084 | 1005 | 724 | 708 |

*100 parts of the oil is preblended with 100 parts of EP(VNB) in VX 1696
[1]weight gain measured over 72 hr at 125° C.
[2]Vestoplast 750 added after cure and after oil addition
[3]Vestoplast 608 added with PE Amorphous PP is an ineffective melt viscosity reducer as illustrated in the comparison of blends in Examples 19 & 20 in Table 5 below. In Example 21 crystalline poly(1-butene) is the melt viscosity reducer.

TABLE 5

| Ex. No. | 19 | 20 | 21 |
|---|---|---|---|
| PE(VNB) | 100 | 100 | 100 |
| PE HD 6706.19 | 60 | 60 | 60 |
| Icecap Clay | 42 | 42 | 42 |
| DC 2-2822 | 2.0 | 2.0 | 2.0 |
| Pt soln (.05 mg/g) | 1.5 | 1.5 | 1.5 |
| Sunpar 150 LW* | 135.6 | 135.6 | 135.6 |
| Vestoplast 750[2] | 35.6[2] | — | — |
| Polytac 500 | — | 35.6 | — |
| PB 0110 poly(1-butene) | — | — | 35.6 |
| ACR visc (Poise) | 1624 | 27808 | 2498 |

*100 parts of the oil is preblended with 100 parts of EP(VNB) in VX 1696
[2]Vestoplast 750 added after cure and after oil addition Illustrative oils which are effective melt viscosity reducers for the EP(VNB) and PE blend function in combination with a paraffinic processing oil, the latter being present in a major proportion by weight based on total oil present. Data for such oils are presented in Examples 22–27 below.

TABLE 6

| Ex. No. | 22 | 23 | 24 | 25 | 26 | 27 | 28 | 29 | 30 |
|---|---|---|---|---|---|---|---|---|---|
| PE(VNB) | 100 | 100 | 100 | 100 | 100 | 100 | 100 | 100 | 100 |
| PB HD 6706.19 | 60 | 60 | — | 60. | 60. | 60. | — | — | 60. |
| PE LL 1001.37 | — | — | 60 | — | — | — | 60 | 60 | — |
| Icecap Clay | 42 | 42 | 42 | 42 | 42 | 42 | 42 | 42 | 42 |
| DC 2-2822 | 2.0 | 2.0 | 2.0 | 2.0 | 2.0 | 2.0 | 2.0 | 2.0 | 2.0 |
| Pt soln (.05 mg/g) | 1.5 | 1.5 | 1.5 | 1.5 | 1.5 | 1.5 | 1.5 | 1.5 | 1.5 |
| Sunpar 150 LW* | 100 | 100 | 100 | 100 | 100 | 100 | 100 | 100 | 100 |
| Plasthall ESO | 30. | — | — | — | — | — | — | — | — |
| Vikoflex 7170 | — | 34.4 | 34.4 | — | — | — | — | — | — |
| Trylox 5900 | — | — | — | 20.8 | — | — | — | 20.8 | 10.3 |
| Trycol 6974 | — | — | — | — | 20.3 | — | 20.3 | — | — |
| Trycol 6961 | — | — | — | — | — | 49.3 | — | — | — |
| Hardness, Shore A | 64 | 61 | 54 | 61 | 61 | 57 | 54 | 53 | 61 |
| UTS (MPa) | 5.23 | 5.23 | 4.56 | 3.8 | 4.70 | 4.05 | 4.17 | 3.92 | 5.52 |
| UE (%) | 436 | 434 | 424 | 295 | 536 | 410 | 371 | 391 | 434 |
| M 100 (MPa) | 2.96 | 2.92 | 2.39 | 2.70 | 2.61 | 2.30 | 2.27 | 2.31 | 3.23 |
| CS, % 22 hr 100° C. | 24 | 33 | 30 | 37 | 40 | 39 | 36 | 33 | 56 |
| Wt gain, %[1] | 226 | 207 | 267 | Disin | 362 | 302 | 362 | 300 | 227 |
| Tension Set (%) | 16 | 16 | 13 | 17 | 19 | 15 | 15 | 16 | — |
| ACR visc (Poise) | 1103 | 1964 | 2145 | 512 | 1535 | 4017 | 1231 | 558 | 1382 |

*100 parts of the oil is preblended with 100 parts of EP(VNB) in VX 1696
[1]weight gain measured over 72 hr at 125° C.

An illustrative example of a block copolymer of a block copolymer of a fatty acid and polyethylene oxide, specifically, poly(12-hydroxystearic acid)-b-polyethylene glycol-b-poly(12-hydrostearic acid) which is an effective melt viscosity reducer for the EP(VNB) and PE blend, is presented in Table 7 below.

TABLE 7

| Ex. No. | 31 |
|---|---|
| PE(VNB) | 100 |
| PE HD 6706.19 | 41 |
| Icecap Clay | 42 |
| DC 2-2822 | 2.0 |
| Pt soln (.05 mg/g) | 1.5 |
| Sunpar 150 LW* | 100 |
| Hypermer B246 SF | 12 |
| ACR visc (Poise) | 947 |

*100 parts of the oil is preblended with 100 parts of EP(VNB) in VX 1696

The following examples 32, 33 & 34 illustrate the effect of substituting VNB for ENB in the EPDM blended with 25 wt % PE as disclosed in the '654 patent. The EP(ENB) is processable, the EP(VNB) is not. Example 34 shows that using a silane cure with the EP(VNB) still yields an unprocessable blend.

TABLE 8

| Ex. No. | 32 | 33 | 34 |
|---|---|---|---|
| PE(ENB)-V5504[1] | 70 | — | — |
| PE(VNB)-MDV002[2] | — | 70 | 70 |
| PE HD 6706.19 | 25 | 25 | — |
| Icecap Clay | 42 | 42 | 42 |
| Luperox 101XL[3] | 0.6 | 0.6 | — |
| DC 2-2822 | — | — | 2.0 |
| Pt soln (.05 mg/g) | — | — | 1.5 |
| Sunpar 150 LW* | 30 | 30 | 30 |
| ACR visc (Poise) | 3015 | No Trans | No Trans |

[1]EPsyn 4506 was not available: it contains, by wt., ethylene 54%, propene 41.5%, ENB 4.5%
V5504 was used instead of EPsyn 4506. V5504 contains, by wt., ethylene 45%, propene 50.3%, ENB 4.7%
[2]MDV002 contains, by wt., ethylene 60%, propene 39%, VNB 1% - the ethylene and propene content is similar to that in EPsyn 4506.

What is claimed is:

1. A thermoplastic elastomer formed from (I) pEPDM, an EPDM polymer of ethylene, a monoolefin containing from 3–10 carbon atoms including from 50% to 70% by weight ethylene, from 0.5% to 5% by weight 5-inyl-2-norbornene, the remainder propylene, and ethylene being present in a major proportion relative to another polymonoolefin; (2) polyethylene present in a major proportion relative to the another polymonoolefin containing from 3–5 carbon atoms, the ratio of polyethylene to pEPDM in the blend being in the range from more t an 1:3 up to about 1:0.6, by weight, the polyethylene being present in an amount greater than 25% by weight, based on total polymer present; and, (3) from 5 to 50 phr of melt viscosity reducer selected from the group consisting of (a) polyolefins selected from the group consisting of isotactic poly(1-butene), ethylene-co-1-butene, propen-co-1-butene and ethylene-co-propene-co-1-butene; (b) oils and waxes having a solubility parameter in the range from about 19.5 to 21.5 and selected from the group consting of epoxidized vegetable oil, ethoxylated alkylphenol, ethoxylated castor oil and hydrogenated castor oil; (c) a block copolymer of a fatty acid and polyethylene oxide having a glass transition temperature lower than 150° C.; and (4) containing from about 50 phr but less than 200 phr paraffinic processing oil.

2. The elastomer of claim 1 wherein the isotactic poly(1-butene), ethylene-co-1-butene and propene-co-1-butene have a $M_w$ in the range from 20,000 to about 900,000; and ethylene-co-propene-co-1-butene has a $M_w$ in the range from 20,000 to about 900,000.

3. The elastomer of claim 1 wherein the melt viscosity reducing oil or wax has a $M_w$ in the range from about 300 to about 2000.

4. The elastomer of claim 1 wherein the block copolymer is poly(12-hydroxystearic acid)-b-polyethylene glycol-b-poly(12-hydroxystearic acid).

5. The elastomer of claim 1 wherein,
    ethylene is present in an amount from 1 to 50 mol % in poly(1-butene) and ethylene-co-1-butene;
    propene is present in an amount from 1 to 60 mol % in propene-co-1-butene; and
    ethylene, propene and 1-butene are present in amounts from 1–50 mol %, 1–60 mol % and 40–98 mol % respectively in ethylene-co-1-butene-co-propene.

6. The elastomer of claim 1 wherein the another polymonoolefin is polypropylene present in a minor amount by weight relative to polyethylene.

7. The elastomer of claim 1 wherein the epoxidized vegetable oil is epoxidized soybean oil.

8. A method for preparing a thermoplastic elastomer comprising,
    mixing (1) pEPDM, an EPDM polymer of ethylene, a monoolefin containing from 3–10 carbon atoms including from 50% to 70% by weight ethylene, from 0.5% to 5% by weight 5-vinyl-2-norbornene, the remainder propylene, and ethylene being present in a major proportion relative to another polymonoolefin; (2) polyethylene present in a major proportion relative to the another polymonoolefin containing from 3–5 carbon atoms, the ratio of polyethylene to pEPDM in the blend being in the range from more than 1:3 up to about 1:0.6, by weight, the polyethylene being present in an amount greater than 25% by weight, based on total polymer present; and, (3) from 5 to 50 phr of a melt viscosity reducer selected from the group consisting of (a) polyolefins selected from the group consisting of isotactic poly(1-butene), ethylene-co-1-butene, propene-co-1-butene and ethylene-co-propene-co-1-butene; (b) oils and waxes having a solubility parameter in the range from about 19.5 to 21.5 and selected from the group consisting of epoxidized vegetable oil, ethoxylated alkylphenol, ethoxylated castor oil and hydrogenated castor oil; (c) a block copolymer of a fatty acid and polyethylene oxide having a glass transition temperature lower than 150° C.; and (4) containing from about 50 phr but less than 200 phr paraffinic processing oil, to form a substantially homogeneous mixture; and
    hot working the mixture at a temperature in the range from about 180° C. to 240° C. with a residence time less than 5 mm, in the presence of a curative to vulcanize the mixture.

9. The process of claim 8 wherein the residence time is in the range from about 30 sec to 2 mm.

10. A thermoplastic elastomer produced by mixing (1) pEPDM, an EPDM polymer of ethylene, a monoolefin containing from 3–10 carbon atoms including from 50% to 70% by weight ethylene, from 0.5% to 5% by weight 5-vinyl-2-norbornene, the remainder propylene, and ethylene being present in a major proportion relative to another polymonoolefin; (2) polyethylene present in a major proportion relative to the another polymonoolefin containing from 3–5 carbon atoms, the ratio of polyethylene to pEPDM in the blend being in the range from more than 1:3 up to about 1:0.6, by weight, the polyethylene being present in an amount greater than 25% by weight, based on total polymer present; and, (3) from 5 to 50 phr of a melt viscosity reducer selected from the group consisting of (a) polyolefins selected from the group consisting of isotactic poly(1-butene), ethylene-co-1-butene, propene-co-1-butene and ethylene-co-propene-co-1-butene; (b) oils and waxes having a solubility parameter in the range from about 19.5 to 21.5 and selected from the group consisting of epoxidized vegetable oil, ethoxylated alkylphenol, ethoxylated castor oil and hydrogenated castor oil; (c) a block copolymer of a fatty acid and polyethylene oxide having a glass transition temperature lower than 150° C.; and (4) containing from about 50 phr but less than 200 phr paraffinic processing oil; and, hot working the mixture at a temperature in the range from about 180° C. to 240° C. with a residence time less than 5 mm, in the presence of a curative to vulcanize the mixture.

11. The elastomer of claim 10 wherein the residence time is in the range from about 30 sec to 2 mm.

12. The elastomer of claim 1 wherein the pEPDM is substantially fully cured.

* * * * *